US007054653B2

(12) United States Patent
Järvi et al.

(10) Patent No.: US 7,054,653 B2
(45) Date of Patent: May 30, 2006

(54) TWO CHANNEL COMMUNICATION SYSTEM BASED ON RDS DATASTREAM BROADCASTING AND THE INTEGRATION OF DIGITAL MOBILE TERMINAL AND VHF/FM RADIO RECEIVER

(75) Inventors: Jyrki Järvi, Helsinki (FI); Jukka Nihtilä, Espoo (FI)

(73) Assignee: Nokia Corporation, Espoo (FI)

( * ) Notice: Subject to any disclaimer, the term of this patent is extended or adjusted under 35 U.S.C. 154(b) by 799 days.

(21) Appl. No.: 09/969,864

(22) Filed: Oct. 4, 2001

(65) Prior Publication Data

US 2003/0069032 A1 Apr. 10, 2003

(51) Int. Cl.
*H04Q 7/20* (2006.01)
*H04B 1/18* (2006.01)

(52) U.S. Cl. .................... 455/466; 455/466; 455/186.1; 455/456; 455/456.5; 455/557; 455/558; 455/2.01; 755/9; 755/24; 709/219

(58) Field of Classification Search .............. 455/186.1, 455/161.2, 419, 420, 466, 456, 456.5, 557, 455/558, 517, 2.01; 379/114; 709/219; 755/9, 755/24

See application file for complete search history.

(56) References Cited

U.S. PATENT DOCUMENTS

| | | | | | |
|---|---|---|---|---|---|
| 5,303,393 | A | | 4/1994 | Noreen et al. | |
| 5,539,635 | A | | 7/1996 | Larson, Jr. | |
| 5,548,828 | A | * | 8/1996 | Kozaki et al. | 455/161.2 |
| 5,797,088 | A | | 8/1998 | Stamegna | |
| 5,907,322 | A | | 5/1999 | Kelly et al. | |
| 5,991,737 | A | | 11/1999 | Chen | |
| 6,038,434 | A | * | 3/2000 | Miyake | 455/186.1 |
| 6,131,042 | A | | 10/2000 | Lee et al. | |
| 6,163,711 | A | | 12/2000 | Juntunen et al. | |
| 6,246,672 | B1 | | 6/2001 | Lumelsky | |
| 6,539,212 | B1 | * | 3/2003 | Kamalski | 455/186.1 |
| 6,678,501 | B1 | | 1/2004 | Valeski | |
| 6,728,531 | B1 | * | 4/2004 | Lee et al. | 455/419 |

FOREIGN PATENT DOCUMENTS

| | | | | |
|---|---|---|---|---|
| DE | 4241 857 | | | 6/1994 |
| DE | 44 27 046 | | | 2/1996 |
| DE | 195 02 922 | | | 8/1996 |
| EP | 0 565 947 | | | 5/1997 |
| GB | 2288951 | A | * | 11/1995 |
| WO | WO 97/21291 | | | 6/1991 |
| WO | WO 97/33434 | | | 9/1997 |
| WO | WO 98/15075 | | | 4/1998 |
| WO | WO 99/04568 | | | 1/1999 |
| WO | WO 99/35809 | | | 7/1999 |
| WO | WO 00/46944 | | | 8/2000 |

* cited by examiner

*Primary Examiner*—David Hudspeth
*Assistant Examiner*—Julio Perez
(74) *Attorney, Agent, or Firm*—Banner & Witcoff, Ltd.

(57) ABSTRACT

The present invention comprises a digital mobile terminal system for accessing mobile internet services including a VHF/AM/FM radio receiver and a subsystem that handles interfaces and interactions between the digital mobile terminal and a radio network via a digital (e.g., RDS) data stream, interfaces and interactions between the digital mobile terminal and a mobile internet services platform and interfaces and interactions between the digital mobile terminal and a user seeking to access and interact with mobile internet services. The present invention also comprises a radio broadcasting server platform for transmitting an RDS data stream including a subsystem that handles interfaces and interaction between the radio broadcasting server platform and a radio network via the digital (e.g., RDS) data stream and interfaces and interactions between the radio broadcasting server platform and a mobile internet services platform. The present invention further comprises a method for operating the digital mobile terminal for accessing mobile internet services and a method for operating a radio broadcasting server platform for transmitting an RDS data stream.

31 Claims, 6 Drawing Sheets

TWO CHANNEL COMMUNICATION SYSTEM BASED ON RDS DATASTREAM BROADCASTING AND THE INTEGRATION OF DIGITAL MOBILE TERMINAL AND VHF/FM RADIO RECEIVER

FIELD OF THE INVENTION

The present invention relates generally to the integration of digital mobile terminals with a radio broadcast transmission. Specifically, the present invention relates to a system and method for linking data to a digital mobile terminal in order to enable a user of a digital mobile terminal to interact with a back-end content provider's information base.

BACKGROUND OF THE INVENTION

Conventional access to back-end content provider information has been via a desktop computer connected to an Internet Service Provider (ISP) via a telephone line (either POTS or ISDN) or via a cable modem or other specialized wire-line media. Using such an arrangement, a user can, once connected to their ISP, access the World Wide Web (WWW) to request and display web pages and from these web pages further request and receive information (news, financial data, entertainment, weather, directions (maps), traffic, etc.) or actually order products and services (food, clothing, computers, household items, etc.). These products, services and information are provided by back-end content providers. There may or may not be a charge to connect to the web pages containing the information provided by the back-end service providers. News services such as Reuters may charge a fee in order to access the information that they provide. Other content providers do not charge but are hopeful that a user will purchase their products or services. Such an arrangement lacks mobility and portability.

FM radio stations broadcast audio signals that contain music, weather, traffic information, sports scores, news, advertising etc. Additionally, FM radio stations have an auxiliary or secondary digital sub-channel available that is used to broadcast a bit stream within the 87.5–108 MHz frequency band. This Radio Data Stream (RDS) data is silently delivered at a rate of approximately 1200–2400 bits per second (bps). Originally developed in Europe, RDS currently enables radio listeners to see the name of the radio station displayed, email addresses or phone numbers, have their clocks synchronized etc. on a relatively small alphanumeric display. This same display is used in vehicles to indicate whether the listener is listening to a cassette tape, a CD (number, track, play time, etc.) FM radio, AM radio, phone mute etc.

A traditional FM radio program or an advertisement during an FM radio broadcast is used to promote information to the audience. This information can be sent in the RDS, including e.g., a Web link, an email address, a phone number or other means to interact with another repository for further information or to procure products or services. This suffers from limitations of its own, such as the relatively small screen size that limits the applications. The screen size is for all practical purposes too small to display a Web site Uniform Resource Locator (URL) or a listing of URLs. Further, to date the means to use the information provided by an RDS data stream has been manual. That is, the user needed to memorize the fleeting information or write it down and manually connect to the corresponding services including mobile internet services. This makes the communication slow and cumbersome. If there is a substantial time delay, the content may lose its significance. For example, at some point in time and travel, it may be too late to select an alternative route in the event of a traffic problem based on preliminary information received from an RDS data stream. A time delay may cause the listener to lose an opportunity to order something that was offered for a limited time. That is, because of the time lag, the interaction with the corresponding services or mobile internet services does not take place and subsequently the service is not used and both the listener and the offerer lose the opportunity.

SUMMARY OF THE INVENTION

To overcome limitations in the prior art described above, and to overcome other limitations that will become apparent upon reading and understanding the description herein of the present invention, the present invention discloses a system, apparatus and method for communicating services to a digital mobile terminal operating within a wireless network. The wireless device is not limited to any preset navigation structure, and provides the ability to remotely access services.

In accordance with one embodiment of the present invention, the present invention contemplates a system and method for integrating a digital mobile terminal, such as a wireless phone, with an RDS signal transmitted over the auxiliary sub-carrier channel by an FM radio station. Specifically the present invention provides a system and method for linking an RDS stream of data to back-end content and transaction services using a digital mobile terminal. The RDS data stream can, for example, contain links to WAP-, SMS-, WWW-, and I-mode based value-added services, such as news, entertainment, and e-commerce. These and similar services are termed mobile internet services.

The present invention provides, therefore, an integrated system and method that combines a digital mobile terminal with back-end content providers via a digital data stream embedded in a radio broadcast such as the FM radio RDS system. The system and method include capturing and saving an RDS data stream, and using the saved RDS data stream to access back-end content via a hypertext link displayed on the screen of the digital mobile terminal. The system and method of the present invention also include definition of the subsystem that integrates an RDS data stream and the Short Message Service (SMS), World Wide Web (WWW) browser module and Wireless Application Protocol (WAP) interfaces of the digital mobile terminal including a memory/buffering scheme and the separate or integrated subsystem to initiate the connection and request the corresponding content, product or service.

BRIEF DESCRIPTION OF THE DRAWINGS

The invention is best described with reference to the detailed description and the following figure, where.

DETAILED DESCRIPTION OF THE PREFERRED EMBODIMENTS

In the following description of the various embodiments, reference is made to the accompanying drawings, which form a part hereof, and in which is shown by way of illustration various embodiments in which the invention may be practiced. It is to be understood that other embodiments may be utilized, and structural and functional modifications may be made without departing from the scope of the present invention.

Figure 1:
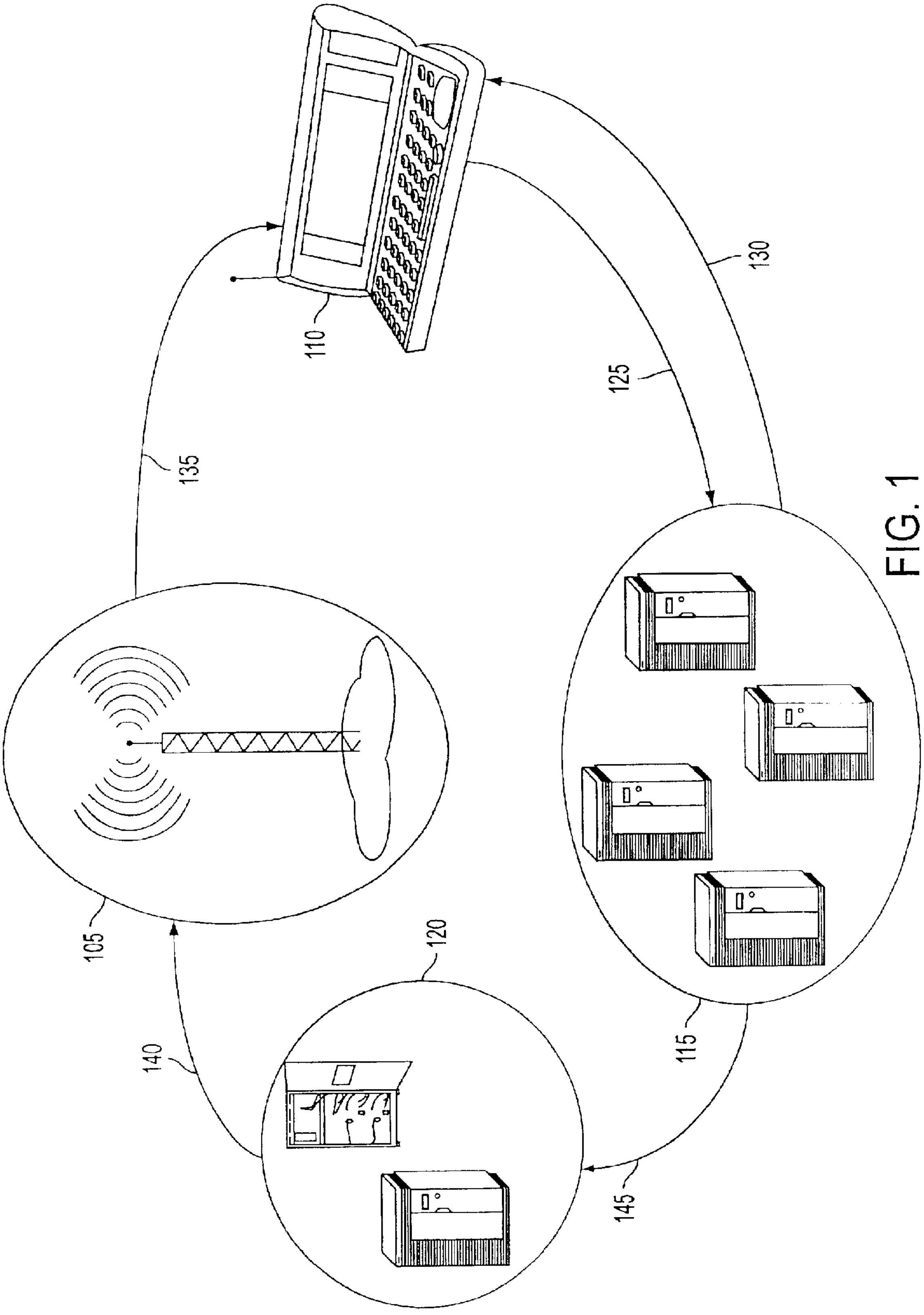
FIG. 1 depicts a two-way communication system based on RDS data stream broadcasting and the integration of a digital mobile terminal and VHF/FM radio receiver according to one embodiment of the present invention.

FIG. 1 depicts the interaction between an FM radio network 105 that transmits an RDS data stream 135, a digital mobile terminal 110, mobile internet services platform 115, and a FM radio broadcasting server platform 120 according to one embodiment of the present invention. Digital mobile terminal 110 includes an FM radio receiver and includes software that captures relevant links and addresses from the RDS data stream. The RDS datastream can for example contain links to WWW-, SMS-, WAP-, and I-mode based value-added services, such as news, entertainment, and e-commerce or even just a phone number. Henceforth, these services are referred as mobile internet services through the whole of this document. Digital mobile terminal 110 saves and displays the captured mobile internet services address. If the subscriber/user selects the mobile internet services address, the result is a request 125 for that service. That is, the digital mobile terminal 110 is connected to mobile internet services platform 115, which results in mobile internet services platform 115 providing a response 130 to digital mobile terminal 110.

For example, if a Web URL is transmitted in the RDS data stream in connection with a radio broadcast, a user of the digital mobile terminal can request further information or services by selecting the displayed URL on the digital mobile terminal. One example might be a URL for an advertiser's Web site that is transmitted in the RDS data stream in connection with an audio advertisement broadcast over an FM radio network.

On the server side, FM radio network 105 is supplied with broadcasting information and data 140 from FM radio broadcasting server platform 120. FM radio broadcasting server platform 120 receives provisioning information and data 145 from mobile internet services platform 115 comprising SMS numbers, WAP addresses and URLs, for example.

The client side (digital mobile terminal) is a system comprising a plurality of subsystems. The subsystem handles all aspects of the RDS data stream and may comprise at least one module and is best understood when discussed and described as a plurality of functional modules. The subsystem as a whole handles the interfaces and interactions between the digital mobile terminal and the FM radio network in the context of the RDS data stream, the interfaces and interactions between the digital mobile terminal and the mobile internet services platform and the interfaces and interactions between the digital mobile terminal and a user/subscriber seeking to access and interact with mobile internet services.

Similarly, the server side (FM radio broadcasting server platform) may comprise a plurality of subsystems. The subsystem that handles all aspects of the RDS data stream may include at least one module and is best understood when described and discussed as a plurality of functional modules. The subsystem as a whole handles the interfaces and interactions between the FM radio broadcasting server platform and the FM radio network in the context of the RDS data stream and the interfaces and interactions between the FM radio broadcasting server platform and the mobile internet services platform.

Figure 2:
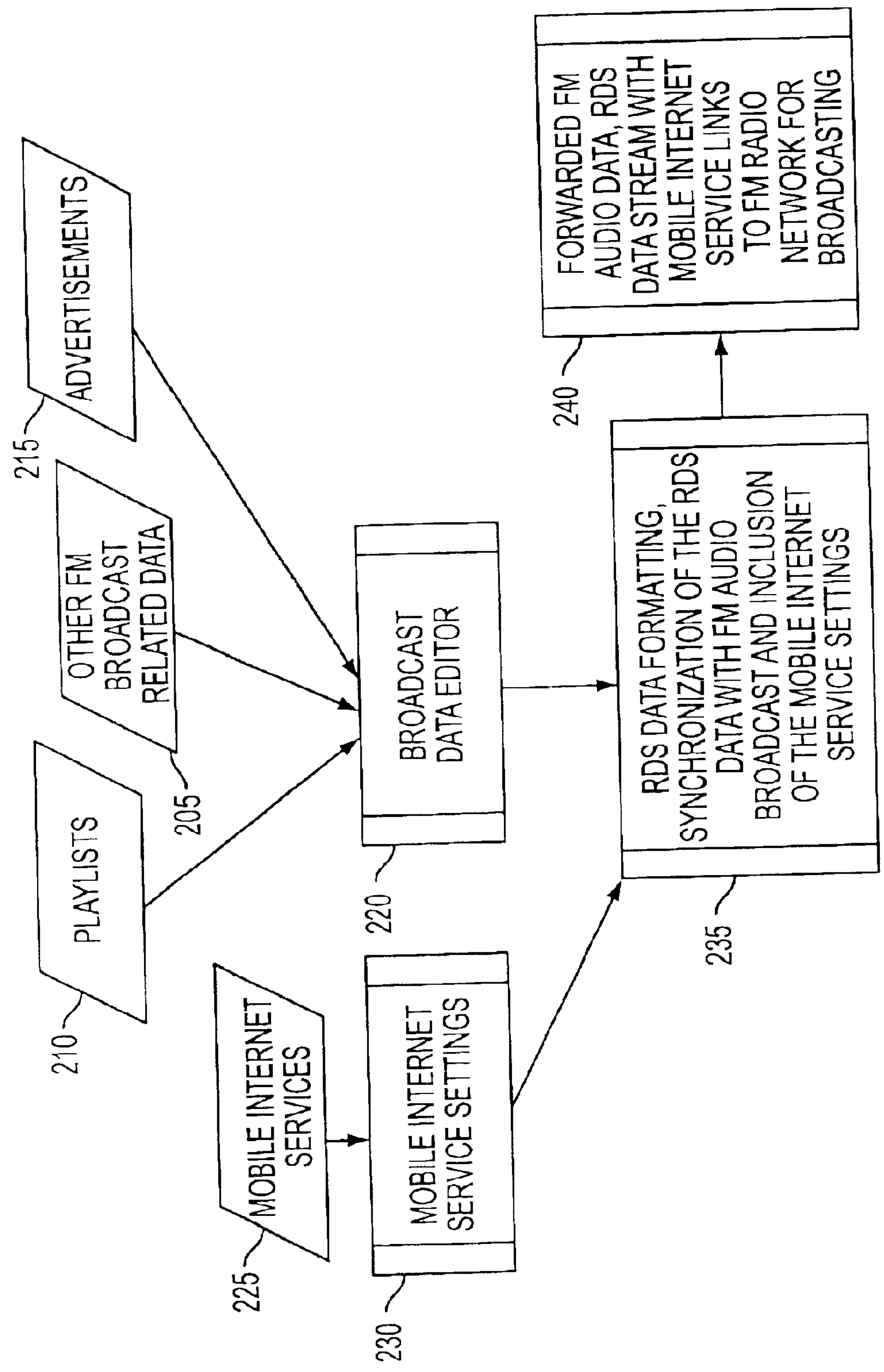
FIG. 2 is a block diagram of the high-level functionality of the server side software broken down into exemplary modules.

Referring to FIG. 2, information and data 140 that is broadcast may include broadcasting related information, playlists, and advertisements, for example. This information is edited by a broadcasting editor. Playlists 210, advertisements 215, and other FM broadcasting related data 205, for example, are submitted to broadcasting data editor module 220. Mobile internet services data 225 are submitted to a module 230 for the addition and adjustment of the mobile internet service settings. These service settings are the standard settings that are needed when using e.g. a WAP-based service. The settings are sent to digital mobile terminal 110 via RDS and stored in a buffer and when the user selects a service, the settings are immediately available, so the service can be utilized immediately. In WAP the necessary settings are: (access point [home page URL, remote access server number, user name and password, WAP gateway IP address, data call type and data call speed], URL, user name and password). In WWW, the necessary settings are only (URL) etc. Edited broadcast data and mobile internet service settings are then forwarded to a module 235 that performs RDS data formatting, synchronization of the RDS data stream with the FM audio broadcast and inclusion of the mobile internet service settings with the RDS data stream and FM audio broadcast. This combination of data (RDS data stream with mobile internet service settings and FM audio broadcast signal) is forwarded by module 240 to the FM radio network for broadcasting.

Figure 3:
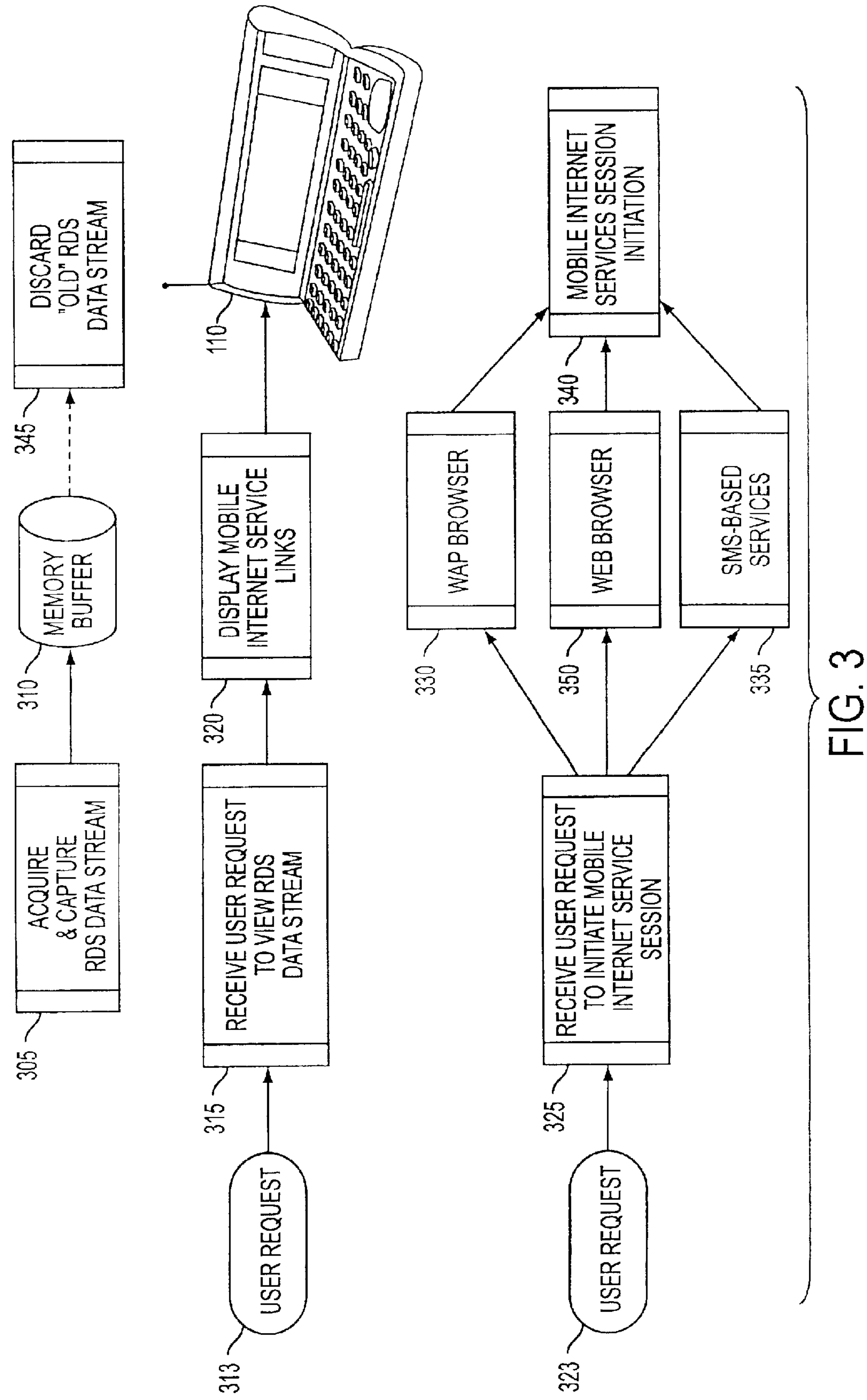
FIG. 3 is a block diagram of the high-level functionality of the client side (digital mobile terminal) software broken down into exemplary modules.

FIG. 3 depicts exemplary client side (digital mobile terminal side) modules used to capture and use the broadcast mobile internet services settings embedded within the FM audio broadcast and RDS data stream. Module 305 acquires and captures the RDS data stream and forwards the captured RDS data stream to memory buffer 310 in the digital mobile terminal. The RDS data stream is retained in memory buffer 310 for a period of time, for example 30 seconds. After the defined time period has expired, a timeout occurs and the "old" RDS data stream in the memory buffer 310 is discarded, erased or overwritten by module 345.

Module 315 receives subscriber/user requests 313 to view the captured RDS data stream and forwards the user/subscriber requests to module 320 to display the mobile internet service links including the captured RDS data stream on the user/subscriber's digital mobile terminal 110. Module 325 receives user/subscriber requests 323 to initiate a mobile internet services session and makes a selection of either WAP browser module 330 or SMS-based services module 335 or Web browser module 350 based on the service settings included in the RDS data stream. WAP browser module 330 automatically extracts WAP settings from the captured RDS data stream. SMS-based services module 335 includes an SMS editor to edit the SMS services number and commands that are automatically extracted from the captured RDS data stream. These commands are used to order some services: (e.g. In Finland there are several SMS services, where you send a command e.g. "weather Helsinki" to a certain phone number and you receive the weather forecast for Helsinki). Both WAP browser module 330 and SMS-based services module 335 forward connection information to mobile internet session initiation module 340, which establishes and maintains a connection between the digital mobile terminal and the mobile internet services platform and establishes and maintains a session between the digital mobile terminal and the mobile internet service platform.

Figure 4:
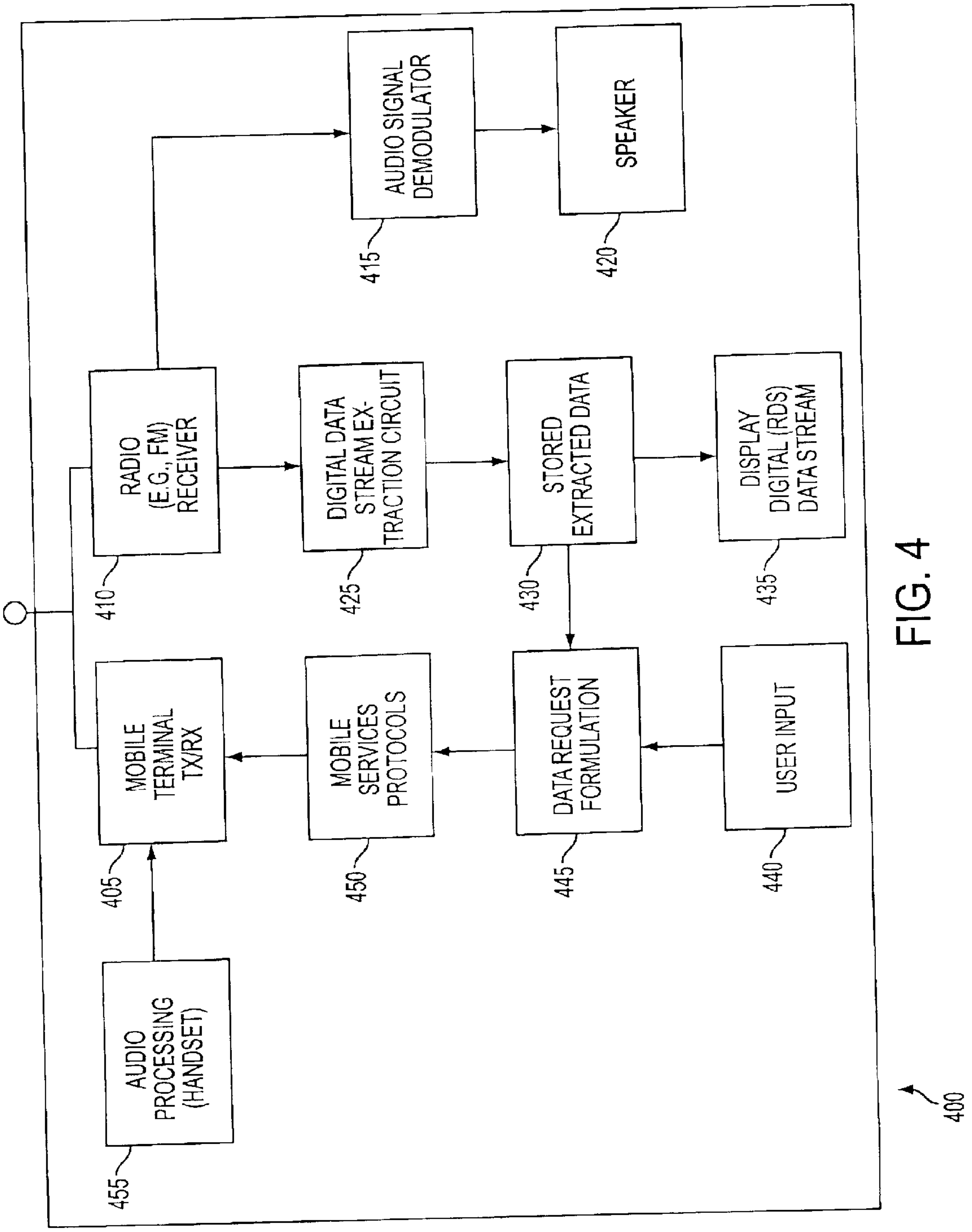
FIG. 4 is a block diagram of a digital mobile terminal according to one embodiment of the present invention.

FIG. 4 is a block diagram of a digital mobile terminal 400 according to one embodiment of the present invention. A digital mobile terminal may include a mobile terminal circuit 405 that provides mobile transmission and reception services using a mobile terminal network and a radio receiver 410 that receives a broadcast radio signal. The mobile terminal circuit 405 interfaces with a user via an audio processing circuit 455. The radio receiver forwards the received radio broadcast to an audio signal demodulator 415 that demodulates an audio portion of a received radio broadcast and provides the demodulated audio portion to a speaker 420 incorporated into the digital mobile terminal.

The radio receiver 410 also forwards the received radio broadcast to a digital data stream extraction circuit 425 that extracts a digital data item from a digital data stream (e.g., RDS data stream) transmitted in conjunction with the radio broadcast. The digital data extraction circuit forwards the extracted digital data item to a memory buffer 430 for storage. The stored digital data item is forwarded to a display device 435 for display on the digital mobile terminal.

The digital mobile terminal may also include a user input device 440 that permits a user of the digital mobile terminal to select the extracted digital data item displayed on the display device 435 to interact with the digital data item stored in the memory buffer 435 and a processor 445 programmed with instructions that, upon selection of the extracted digital data item displayed on the display device, causes a service request to be transmitted through the mobile terminal circuit 405 on the basis of the extracted digital data item. The processor further interacts with a mobile services protocol circuit 450 in order to invoke the corresponding/proper protocol for use with the displayed digital data item.

Figure 5:
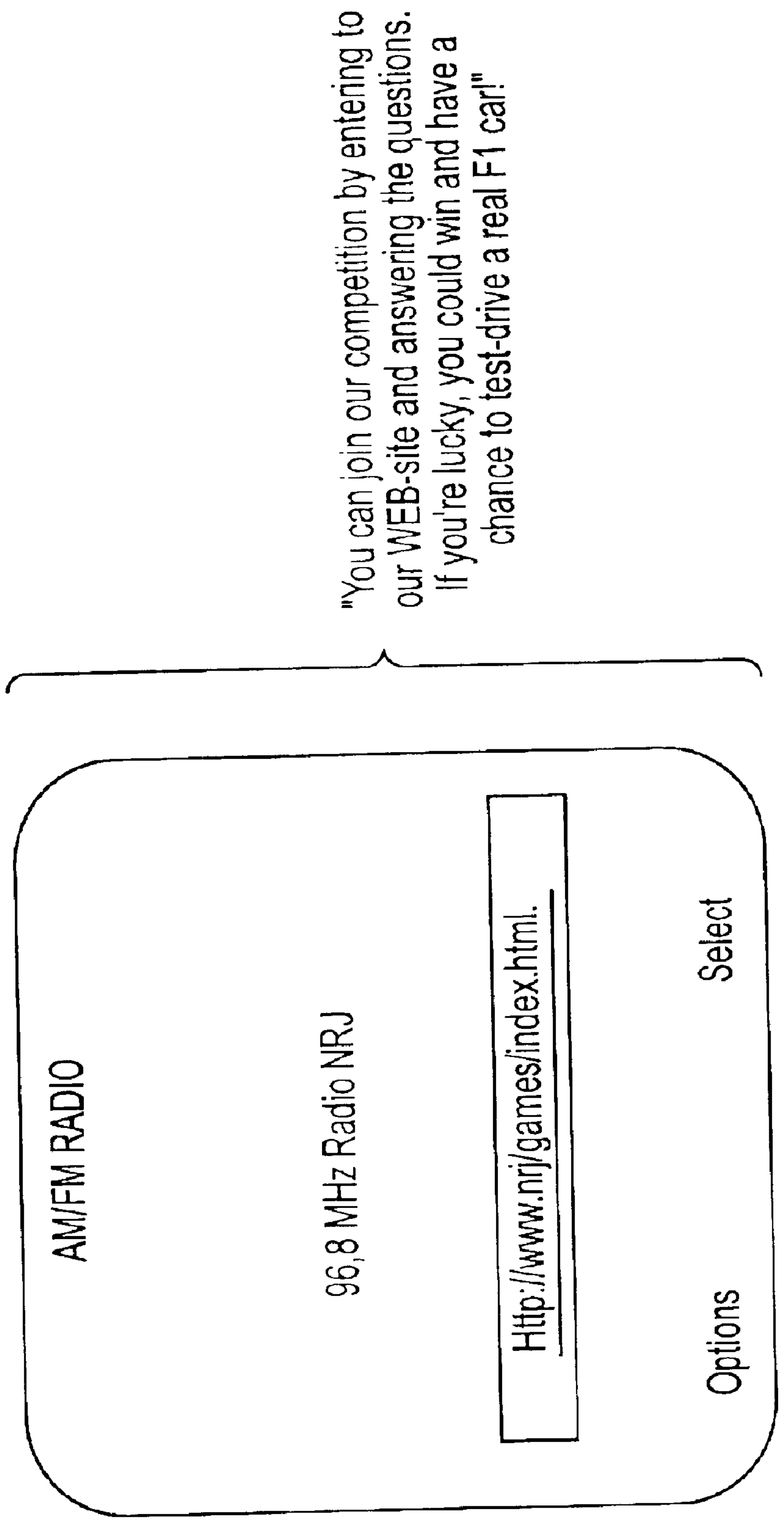
FIG. 5 is an exemplary embodiment of a digital mobile terminal display.

FIG. 5 is an exemplary embodiment of a digital mobile terminal display. According to this embodiment, there could be "on-line" links that can be acquired while listening to a program. The links can be presented to a user as actual links or the link could be whatever type of banner or link is broadcast.

Figure 6:
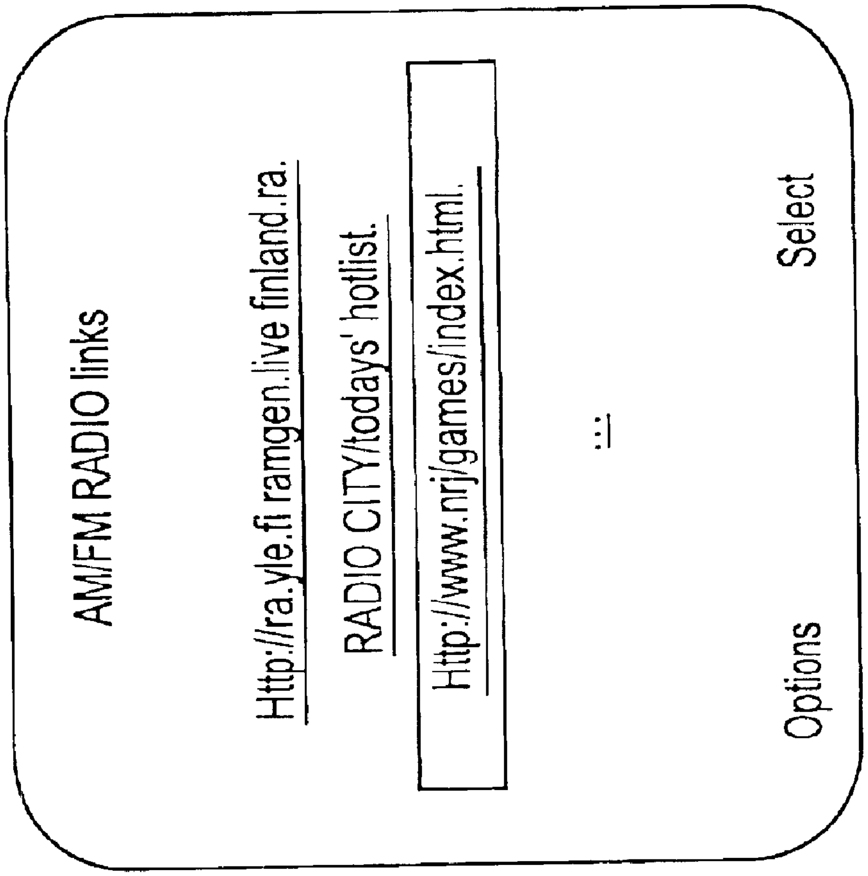
FIG. 6 is another exemplary embodiment of a digital mobile terminal display.

FIG. 6 is another exemplary embodiment of a digital mobile terminal display. According to this embodiment, there may be several links stored in the memory buffer of the digital mobile terminal (the number of links able to be displayed depends on the size of the memory buffer in the digital mobile terminal) and a user can (even when not listening to a radio broadcast anymore) choose any of the links still stored in the memory buffer and connect to the offered service. The links can be of any type. In this example, the first and third links are WWW-based and the second link is SMS-based. Whenever a user selects any type of a link, the related service settings stored in the memory buffer of the digital mobile terminal are activated and connection between the digital mobile terminal and the service platform is established using proper connection.

While the digital mobile terminal has been described in terms of its component circuits, it should be noted that any or all of these circuits may be implemented in software or hardware or any combination thereof, including but not limited to Application Specific Integrated Circuits (ASICs) or Field Programmable Gate Arrays (FPGAs) or any equivalent technology.

While the modules described above have been described in terms of software, the modules could also be implemented in Application Specific Integrated Circuits (ASICs) or Field Programmable Gate Arrays (FPGAs) or any other equivalent device. The present invention is described in terms of FM radio broadcasts but AM radio broadcasts, TV or any other transmission technologies are within the scope of the present invention. An FM RDS data stream is merely one example of the present invention. Any other type of computer readable data embedded within or transmitted with a radio broadcast is within the scope of the present invention. While particular embodiments of the present invention have been described and illustrated, it should be noted that the invention is not limited thereto since modifications may be made by persons skilled in the art. The present application contemplates any and all modifications within the spirit and scope of the underlying invention disclosed and claimed herein.

What is claimed is:

1. A digital mobile terminal system for accessing services comprising:

a radio receiver integrated with a digital mobile terminal; and a subsystem that handles interfaces and interactions between said digital mobile terminal and a radio network via a digital data stream, interfaces and interactions between said digital mobile terminal and a mobile services platform and interfaces and interactions between said digital mobile terminal and a user seeking to access and interact with services.

2. A radio broadcasting server platform for transmitting a digital data stream comprising a subsystem that handles interfaces and interactions between said radio broadcasting server platform and a radio network via the digital data stream and interfaces and interactions, including mobile service settings for service session establishment, between said radio broadcasting server platform and a mobile services platform.

3. A digital mobile terminal for accessing services comprising:

a radio receiver integrated with said digital mobile terminal; and a processor programmed with computer-readable instructions that perform the steps of:

capturing a digital data stream transmitted as part of a radio broadcast;

storing said captured digital data stream in a memory buffer;

displaying a service link embedded within said captured digital data stream on said digital mobile terminal;

accepting a user request to initiate a service session, based on a service description included in said digital data stream; and establishing a connection between said digital mobile terminal and a mobile services platform.

4. The digital mobile terminal according to claim 3, wherein the processor is further programmed to perform the steps of:

maintaining a connection between said digital mobile terminal and the mobile services platform; and establishing and maintaining a service session between said digital mobile terminal and said mobile services platform.

5. The digital mobile terminal according to claim 3, wherein said digital mobile terminal selects a WAP browser if WAP settings are extracted from said captured digital data stream.

6. The digital mobile terminal according to claim 3, wherein said digital mobile terminal selects an SMS-based services module and SMS editor if SMS settings are extracted from said captured digital data stream.

7. The digital mobile terminal according to claim 3, wherein said digital mobile terminal selects a WEB browser if WWW settings are extracted from said captured digital data stream.

8. The digital mobile terminal according to claim 3, wherein said captured digital data stream contains embedded mobile service settings corresponding to the displayed service link embedded within said captured digital data stream on said digital mobile terminal.

9. The digital mobile terminal according to claim 3, wherein the processor is further programmed to perform the step of:

removing said captured digital data from said memory buffer upon expiration of a predefined period of time.

10. The digital mobile terminal according to claim 3, wherein a plurality of digital data streams are captured and stored in the memory buffer for one of immediate interaction and later interaction.

11. The digital mobile terminal according to claim 3, wherein the captured digital data stream transmitted as part of a radio broadcast is an RDS data stream.

12. A radio broadcasting server platform for transmitting an RDS data stream comprising:

a broadcast editor module for accepting data from a plurality of sources, said data comprising playlists, advertisements and other broadcast related data;

a mobile service settings module for accepting mobile service settings;

an RDS data manipulation module that formats said RDS data stream and synchronizes said RDS data stream with an audio broadcast and includes mobile service settings with said RDS data stream; and a module that forwards said RDS data stream including said mobile service settings and said audio broadcast to said radio network.

13. A method for operating a digital mobile terminal for accessing services comprising the steps of:

capturing a digital data stream transmitted as part of a radio broadcast;

storing said captured digital data stream in a memory buffer;

displaying a mobile internet service link embedded within said captured digital data stream on said digital mobile terminal;

accepting a user request to initiate a mobile internet service session;

selecting one of a Wireless Application Protocol (WAP) browser module, World Wide Web (WWW) browser module and a Short Message Service (SMS)-based services module based on a service description included in said digital data stream; and establishing a connection between said digital mobile terminal and a mobile services platform.

14. The method for operating a digital mobile terminal according to claim 13, further comprising the steps of:

maintaining a connection between said digital mobile terminal and the mobile services platform; and establishing and maintaining a service session between said digital mobile terminal and said mobile services platform.

15. The method for operating a digital mobile terminal according to claim 13, wherein said digital mobile terminal selects a WAP browser if WAP settings are extracted from said captured digital data stream.

16. The method for operating a digital mobile terminal according to claim 13, wherein said digital mobile terminal selects an SMS-based services module and edits a SMS service number and command if SMS settings, including said SMS service number and command, are extracted from said captured digital data stream.

17. The method for operating a digital mobile terminal according to claim 13, wherein said digital mobile terminal selects a WEB browser if WWW settings are extracted from said captured digital data stream.

18. The method for operating a digital mobile terminal according to claim 13, wherein said captured digital data stream contains embedded mobile service settings corresponding to the displayed service link embedded within said captured digital data stream of said digital mobile terminal.

19. The method for operating a digital mobile terminal according to claim 13, further comprising the step of removing said captured digital data from said memory buffer upon expiration of a predefined period of time.

20. The method for operating a digital mobile terminal according to claim 13, wherein a plurality of digital data streams are captured and stored in the memory buffer for one of immediate interaction and later interaction.

21. The method for operating a digital mobile terminal according to claim 13, wherein the captured digital data stream transmitted as part of a radio broadcast is a RDS data stream.

22. A method for operating a radio broadcasting server platform for transmitting a digital data stream comprising the steps of:

accepting data from a plurality of sources, said data comprising playlists, advertisements and other broadcast related data;

accepting mobile service settings;

formatting said digital data stream;

including mobile service settings with said digital data stream;

synchronizing said digital data stream with an audio broadcast; and forwarding said digital data stream including said mobile service settings and said audio broadcast to a radio network.

23. A digital mobile terminal comprising:

a mobile terminal circuit that provides mobile transmission and reception services using a mobile terminal network;

a radio receiver that receives a broadcast radio signal;

an audio signal demodulator coupled to said radio receiver, wherein said audio signal demodulator demodulates an audio portion of a received radio broadcast;

a speaker coupled to said audio signal demodulator, wherein said speaker is incorporated into the digital mobile terminal and receives said demodulated audio portion of said received radio broadcast;

a digital data stream extraction circuit, coupled to said radio receiver, which extracts a digital data item from a digital data stream transmitted in conjunction with the radio broadcast;

a memory buffer, coupled to said digital extraction circuit, said memory buffer used for storing said extracted digital data item;

a display device for displaying said extracted digital data item on the digital mobile terminal;

a user input device that permits a user of the digital mobile terminal to select the extracted digital data item displayed on the display device, wherein said display device further interacts with said extracted digital data item stored in said memory buffer; and a processor programmed with instructions that, upon selection of the extracted digital data item displayed on the display device, causes a service request to be transmitted through the mobile terminal circuit on the basis of the extracted digital data item.

24. The digital mobile terminal according to claim 23, wherein said processor further interacts with a mobile services protocol circuit in order to select from among a plurality of protocols for use with the displayed digital data item.

25. The digital mobile terminal of claim 23, wherein the extracted data item comprises a Universal Resource Locator (URL) associated with a Web page, and wherein the service request comprises a request to receive information from the Web page.

26. The digital mobile terminal of claim 25, wherein the service request comprises a Wireless Application Protocol (WAP) request.

27. The mobile terminal of claim 25, wherein the service request comprises a Short Messaging Service (SMS) request.

28. A method of operating a mobile terminal in a mobile data network, comprising the steps of:

(1) demodulating the audio portion of a radio broadcast and providing an audio output representing the audio portion of the radio broadcast;

(2) extracting a data item from a data stream transmitted in conjunction with the radio broadcast;

(3) displaying the extracted data item on a display of the mobile terminal; and (4) in response to user input, using the extracted data item to automatically formulate and transmit a request for service through the mobile data network.

29. The method of claim 28, wherein step (2) further comprises the steps of:

(a) buffering the extracted data item for a predetermined time period; and (b) purging the extracted data item after the predetermined time period.

30. The method of claim 28, wherein step (2) further comprises the step of displaying a Universal Resource Locator (URL) representing a Web page address on the display; and wherein step (4) further comprises the step of transmitting a Wireless Application Protocol (WAP) request to an entity corresponding to the URL.

31. The method of claim 30, wherein step (4) further comprises the step of determining on the basis of the extracted data item whether the data item is associated with WAP services.

* * * * *